(12) United States Patent
Fujita (10) Patent No.: US 10,243,480 B2
(45) Date of Patent: Mar. 26, 2019

(54) MULTI-CELL CONVERTER APPARATUS INCLUDING ISOLATING COMPONENT

(71) Applicant: FUJI ELECTRIC CO., LTD., Kanagawa (JP)

(72) Inventor: Satoru Fujita, Tachikawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 48 days.

(21) Appl. No.: 15/686,162

(22) Filed: Aug. 25, 2017

(65) Prior Publication Data

US 2018/0109199 A1 Apr. 19, 2018

(30) Foreign Application Priority Data

Oct. 14, 2016 (JP) .................. 2016-203145

(51) Int. Cl.
| | | |
|---|---|---|
| *H02M 7/493* | (2007.01) | |
| *H02M 7/12* | (2006.01) | |
| *H02M 1/096* | (2006.01) | |
| *H02M 7/483* | (2007.01) | |

(52) U.S. Cl.
CPC .............. *H02M 7/12* (2013.01); *H02M 1/096* (2013.01); *H02M 7/493* (2013.01); *H02M 2007/4835* (2013.01)

(58) Field of Classification Search
CPC ......... H02M 1/096; H02M 2007/4835; H02M 7/12; H02M 7/217; H02M 7/493
See application file for complete search history.

(56) References Cited

U.S. PATENT DOCUMENTS

| | | | | |
|---|---|---|---|---|
| 2,247,057 A | * | 6/1941 | Hull ...................... | H02M 7/15 327/545 |
| 4,087,701 A | * | 5/1978 | Anderson ............... | H04B 3/56 307/149 |
| 7,558,087 B2 | * | 7/2009 | Meysenc ............... | H02M 7/219 363/35 |
| 2008/0304300 A1 | * | 12/2008 | Raju ..................... | H02M 7/217 363/126 |

FOREIGN PATENT DOCUMENTS

| | | |
|---|---|---|
| JP | 2005-012950 A | 1/2005 |
| JP | 2006-081232 A | 3/2006 |
| JP | 2006-109686 A | 4/2006 |
| JP | 2008-228440 A | 9/2008 |
| KR | 101717082 B1 * | 3/2017 |

* cited by examiner

*Primary Examiner* — Jue Zhang
*Assistant Examiner* — Jye-June Lee (57) ABSTRACT

To provide a multi-cell converter apparatus that is both miniature and low-cost, provided is a multi-cell converter apparatus including a plurality of AC/DC converting cells with AC sides that are connected in series to an AC power supply; and a plurality of isolating components that are connected in cascade and each transmit a potential difference input thereto to a later stage while providing isolation between input and output. Each AC/DC converting cell has a terminal that is at a reference potential inside the AC/DC converting cell connected to a terminal of a corresponding isolating component among the plurality of isolating components.

9 Claims, 7 Drawing Sheets

FIG. 1

Prior Art

MULTI-CELL CONVERTER APPARATUS INCLUDING ISOLATING COMPONENT

The contents of the following Japanese patent application are incorporated herein by reference:
NO. 2016-203145 filed on Oct. 14, 2016.

BACKGROUND

1. Technical Field

The present invention relates to a multi-cell converter apparatus.

2. Related Art

Conventionally, an AC/DC converter is known that includes a plurality of AC/DC converter cells and forms a multi-cell converter, as shown in Patent Documents 1 to 4, for example.
Patent Document 1: Japanese Patent Application Publication No. 2008-228440
Patent Document 2: Japanese Patent Application Publication No. 2006-109686
Patent Document 3: Japanese Patent Application Publication No. 2006-081232
Patent Document 4: Japanese Patent Application Publication No. 2005-012950

The plurality of AC/DC converter cells provided in such a multi-cell converter have internal drive circuits that operate according to a different reference potential in each cell. Such drive circuits operating at different reference potentials must be provided with drive power and control signals while maintaining electrical isolation from each other. However, when the AC input voltage of the multi-cell converter becomes a high voltage that exceeds several hundred volts, for example, this results in adopting components having a withstand voltage corresponding to a high voltage as the isolating components used to ensure the isolation are adopted, and this causes an increase in the cost and the implementation area. Furthermore, a technique is known of transmitting and receiving optical signals as the control signals supplied to the plurality of AC/DC converter cells, in order ensure the isolation, but optical components are more expensive than electrical components, and therefore the cost is further increased.

SUMMARY

Therefore, it is an object of an aspect of the innovations herein to provide a multi-cell converter apparatus, which is capable of overcoming the above drawbacks accompanying the related art. The above and other objects can be achieved by combinations described in the claims.

According to a first aspect of the present invention, provided is a multi-cell converter apparatus comprising: a plurality of AC/DC converting cells with AC sides that are connected in series to an AC power supply; and a plurality of isolating components that are connected in cascade and each transmit a potential difference input thereto to a later stage while providing isolation between input and output, wherein each AC/DC converting cell has a terminal that is at a reference potential inside the AC/DC converting cell connected to a terminal of a corresponding isolating component among the plurality of isolating components.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
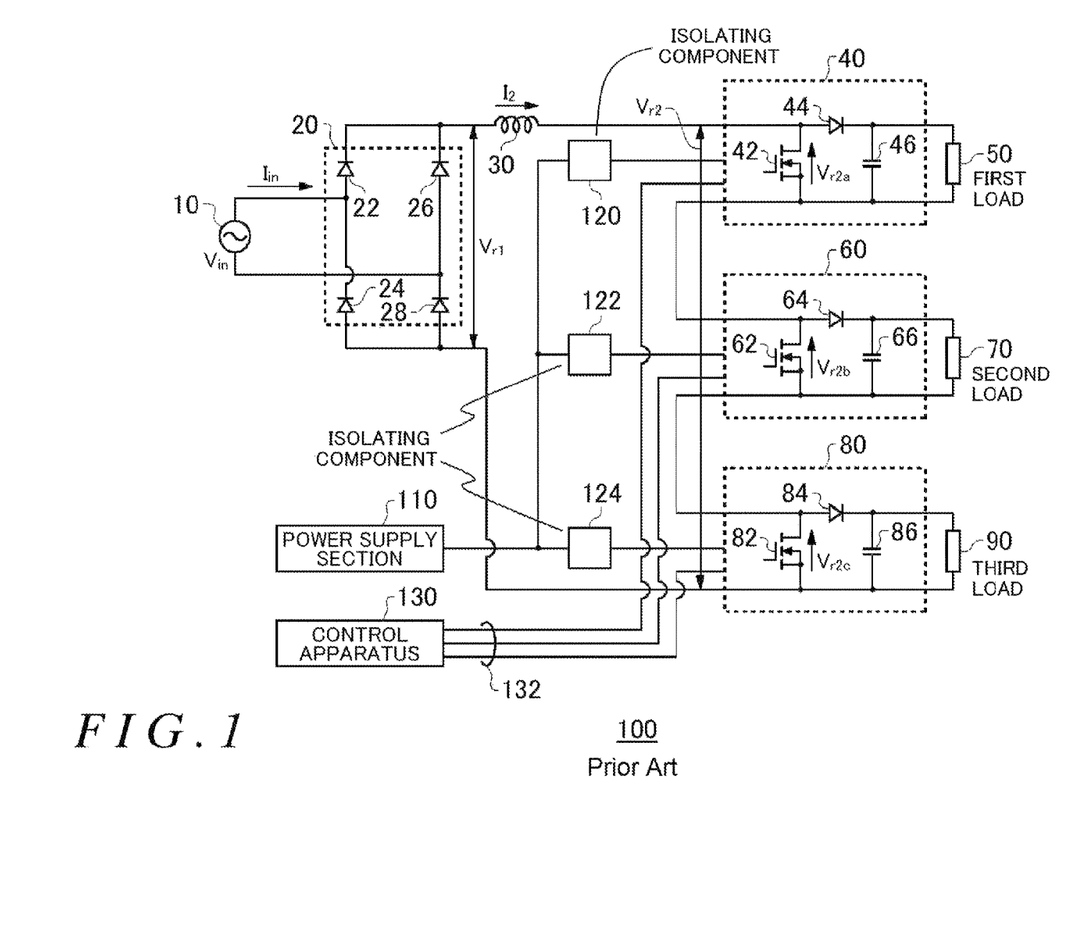
FIG. 1 shows an exemplary configuration of an AC/DC converter.

FIG. 1 shows an exemplary configuration of an AC/DC converter 100. FIG. 1 shows an example configured to, in a case where the AC/DC converter 100 includes three converter cells connected in series on the AC side, supply each converter independently with a control signal and a power supply for driving. The AC/DC converter 100 shown in FIG. 1 is an example that converts AC voltage input supplied from an AC power supply 10 into DC voltage, and supplies the DC voltage to each of a first load 50, a second load 70, and a third load 90. The AC/DC converter 100 includes a rectifying section 20, a reactor 30, a first converter cell 40, a second converter cell 60, a third converter cell 80, a power supply section 110, an isolating component 120, an isolating component 122, an isolating component 124, a control apparatus 130, and an optical waveguide 132.

The rectifying section 20 is connected to the AC power supply 10, and rectifies the AC voltage input from the AC power supply 10. The rectifying section 20 includes a plurality of diode elements, and performs half-wave rectification or full-wave rectification on the AC voltage input thereto. FIG. 1 shows an example in which the rectifying section 20 includes a diode element 22, a diode element 24, a diode element 26, and a diode element 28, and performs full-wave rectification on the AC voltage. Here, the output voltage of the rectifying section 20 is $V_{r1}$.

The reactor 30 has one end that is connected to the positive-side output of the rectifying section 20, and smooths the voltage input thereto. The other end of the reactor 30 is connected to one input terminal of the first converter cell 40. The first converter cell 40, the second converter cell 60, and the third converter cell 80 each convert the rectified AC voltage that is input between the two input terminals into a DC voltage, and output the resulting DC voltage.

The other input terminal of the first converter cell 40 is connected to one input terminal of the second converter cell 60. The other input terminal of the second converter cell 60 is connected to one input terminal of the third converter cell 80. The other input terminal of the third converter cell 80 is connected to the negative-side output of the rectifying section 20. In other words, the two input terminals of each of the first converter cell 40, the second converter cell 60, and the third converter cell 80 are connected in series. Here, the voltage between the one input terminal of the first converter cell 40 and the other input terminal of the third converter cell 80 is $V_{r2}$.

The first converter cell 40 includes a switch element 42, a diode element 44, and a capacitance element 46. The switch element 42 switches the electrical connection between the input terminals to be either connected or disconnected. The switch element 42 is preferably formed by a semiconductor device. The switch element 42 includes a semiconductor switch such as a MOSFET, IGBT, or BJT, for example. As an example, the switch element 42 switches the electrical connection between a drain terminal and a source terminal to be either connected or disconnected, according to the signal voltage input to a gate terminal.

The diode element 44 performs rectification by transmitting the positive voltage input to the first converter cell 40 to the output terminal side. The capacitance element 46 is charged by the charge supplied from the diode element 44 and outputs, to the first load 50, the DC voltage that has been smoothed to be a substantially constant voltage. The first converter cell 40 further includes a drive circuit that drives the switch element 42.

FIG. 1 shows an example in which the first converter cell 40, the second converter cell 60, and the third converter cell 80 have substantially the same circuit configuration. In other words, the second converter cell 60 includes a switch element 62, a diode element 64, a capacitance element 66, and a drive circuit, and outputs to the second load 70 the DC voltage obtained by smoothing the voltage input thereto. The third converter cell 80 includes a switch element 82, a diode element 84, a capacitance element 86, and a drive circuit, and outputs to the third load 90 the DC voltage obtained by smoothing the voltage input thereto.

The power supply section 110 supplies a power supply voltage to the drive circuit of each converter cell. Since the reference potential of the drive circuit in each converter cell is different, the power supply section 110 supplies the power supply voltages while maintaining the electrical isolation between the converter cells. For example, the power supply section 110 supplies each power supply voltage to the corresponding drive circuit via an isolating component. FIG. 1 shows an example in which the power supply section 110 supplies the power supply voltage to the drive circuit of the first converter cell 40 via the isolating component 120. Furthermore, the power supply section 110 supplies the power supply voltage to the drive circuit of the second converter cell 60 via the isolating component 122. Yet further, the power supply section 110 supplies the power supply voltage to the drive circuit of the third converter cell 80 via the isolating component 124.

The control apparatus 130 supplies a control signal to the drive circuit of each converter cell. Since the reference potential of the drive circuit in each converter cell is different, the control apparatus 130 supplies the control signals while maintaining the electrical isolation between the converter cells. For example, the control apparatus 130 supplies the drive circuits with control signals that have been converted into optical signals. Instead, the control apparatus 130 may supply the drive circuits with the control signals via isolating components, in a similar manner as the power supply section 110. FIG. 1 shows an example in which the control apparatus 130 converts the control signals into optical signals and supplies the converted optical signals to the respective drive circuits. In this case, the control apparatus 130 supplies the optical signal to each converter cell via the optical waveguide 132. The optical waveguide 132 is optical fiber, for example.

The AC/DC converter 100 described above uses three converter cells to supply DC voltage to three loads. Here, the withstand voltages for the input voltages of the first converter cell 40, the second converter cell 60, and the third converter cell 80 are each $V_p$. By adjusting the switching timing of the switch element of each converter cell, the AC/DC converter 100 can increase the input voltage of the AC/DC converter 100 to be greater than the withstand voltages $V_p$ of the individual converter cells. The following describes the switching timing of the switch elements of such an AC/DC converter 100.

Figure 2:
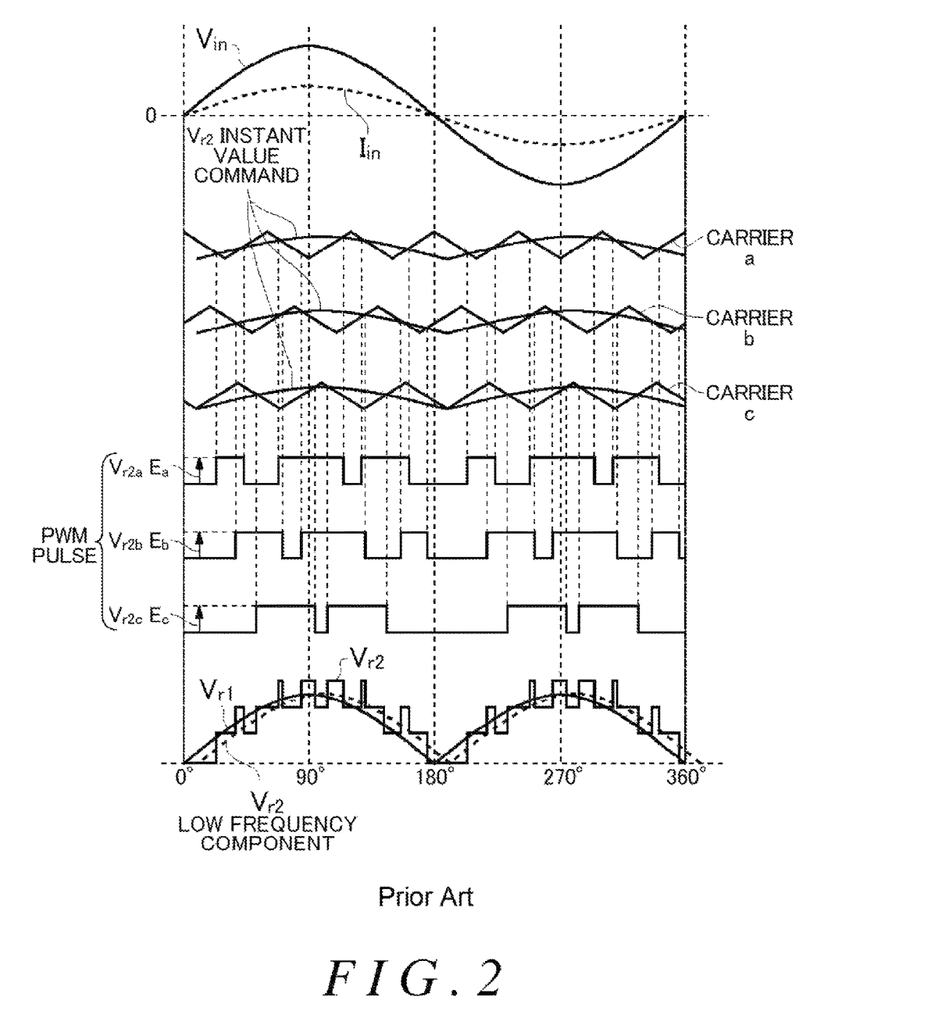
FIG. 2 shows an exemplary operational waveform in each component of the AC/DC converter 100 shown in FIG. 1.

FIG. 2 shows an exemplary operational waveform in each component of the AC/DC converter 100 shown in FIG. 1. In FIG. 2, the horizontal axis indicates time, and the vertical axis indicates a voltage value or a current value. The drive circuit of each converter cell performs switching of the switch element according to a predetermined carrier signal. Here, each converter cell adjusts the switching timing of the other switch elements by using carrier signals that have different phases and substantially the same amplitude values and frequencies, for example. The carrier signals are triangular wave signals with phases differing from each other by 120 degrees, for example.

FIG. 2 shows an example in which carrier "a" is used as the carrier signal of the first converter cell 40, carrier "b" is used as the carrier signal of the second converter cell 60, and carrier "c" is used as the carrier signal of the third converter cell 80. Furthermore, FIG. 2 shows an example in which each converter cell compares the voltage input thereto to a triangular wave signal with a predetermined frequency, and switches the switch element to the disconnected state when the triangular wave signal is smaller than the input voltage. In this way, the converter cells each control the switching of the switch elements based on the input signals and the carrier signals that have the same amplitude value and frequency, and therefore when the respective signals (PWM pulse) transmitted to capacitance elements at later stages are smoothed (averaged), the DC voltage becomes substantially the same.

Here, the drive circuit of each converter cell may further include a feedback circuit that sets the maximum peak value of the PWM pulse to be a voltage value that is less than a predetermined voltage. In this way, when the voltages $V_{r2a}$, $V_{r2b}$, and $V_{r2c}$ obtained by voltage-dividing the output voltage $V_{r1}$ of the rectifying section 20 are input to the respective converter cells, it is possible to make the maximum value of the input voltage $V_{r2a}$ of the first converter cell 40 be $E_a$, the maximum value of the input voltage $V_{r2b}$ of the second converter cell 60 be $E_b$, and the maximum value of the input voltage $V_{r2c}$ of the third converter cell 80 be $E_c$.

Furthermore, by using substantially the same circuit for each of the first converter cell 40, the second converter cell 60, and the third converter cell 80, it is possible to make $E_a$, $E_b$, and $E_c$ substantially the same value. As an example, when the maximum value of the output voltage $V_{r1}$ of the rectifying section 20 is E, it is possible to realize a relationship of $E_a = E_b = E_c \approx E/3$. The maximum value E is substantially the same value as the maximum amplitude value of the AC voltage input supplied by the AC power supply 10, and therefore the withstand voltage $V_p$ of each converter can be reduced to be substantially ⅓ of the withstand voltage corresponding to the AC voltage that is input.

Accordingly, it is possible to make the components provided in each converter cell components with low withstand voltages, and to reduce the implementation area and the cost. Furthermore, since it is possible to reduce the voltage being handled by each converter cell, it is possible to reduce the switching loss as well. Yet further, as shown by the waveform of the voltage $V_{r2}$ shown in FIG. 2, the waveform of the voltage $V_{r2}$ resulting from the overall operation of the AC/DC converter 100 becomes three times the carrier frequency used by each converter cell. In other words, the carrier frequency of each converter cell can be decreased according the number of converter cells.

In the manner described above, the AC/DC converter 100 in which the plurality of converter cells are connected in series can realize miniaturization, reduced cost, high efficiency, and the like. However, such an AC/DC converter 100 has a different reference voltage for each converter cell, and therefore it is necessary to supply each control signal and power supply in a manner to be electrically isolated from each other to the drive circuit of each converter cell. In this case, the input side of the AC/DC converter 100 generates the voltage $V_{r1}$ with the maximum value E, and therefore when the power supply voltage is supplied using the isolating component 120, the isolating component 122, and the isolating component 124, the withstand voltages of these isolating components must be greater than the maximum value E.

In other words, components with high withstand voltages end up being used as the isolating component 120, the isolating component 122, the isolating component 124, and the like, which results in an increase in the implementation area and the cost. Furthermore, although it is possible to omit the isolating components by using the optical waveguide 132, this results in using high-price optical components such as an electro-optical converting section, a photoelectric converting section, and an optical waveguide, which results in an increased cost in this case as well. Therefore, the multi-cell converter apparatus according to the present embodiment provides an apparatus that prevents such an increase in implementation area and cost, to realize a miniature and low-cost apparatus.

Figure 3:
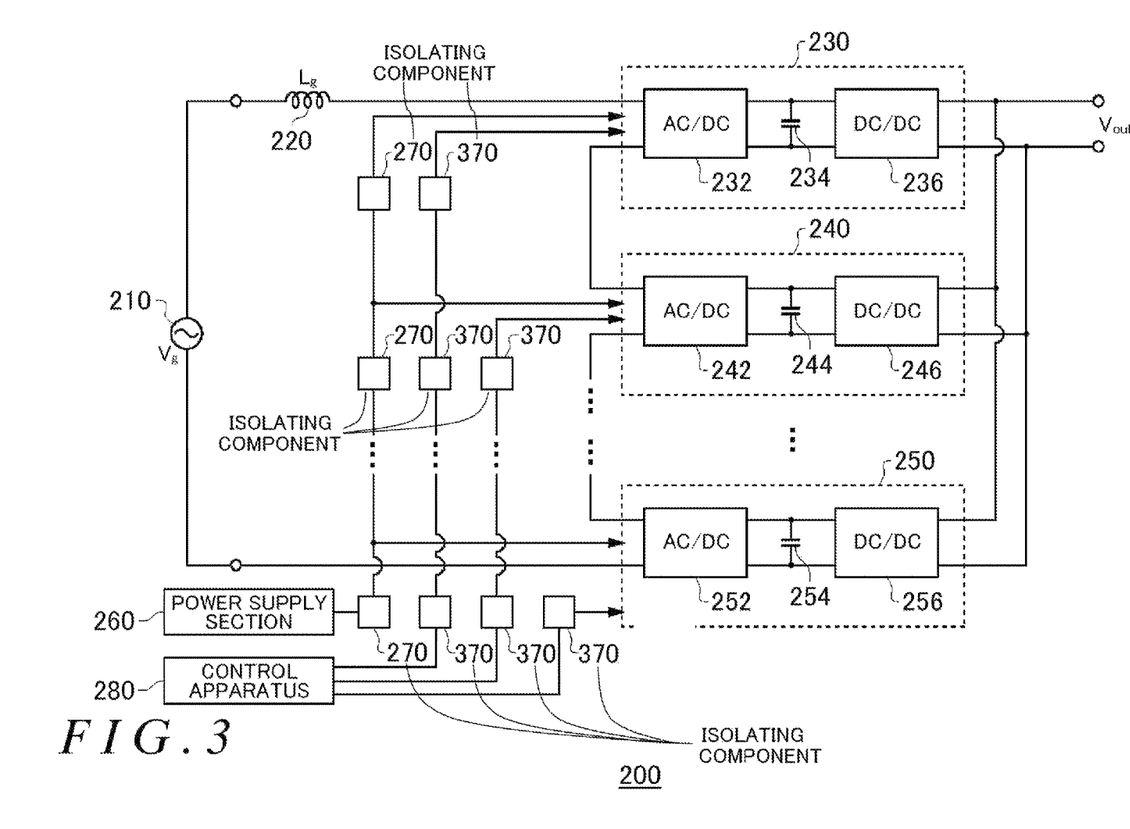
FIG. 3 shows an exemplary configuration of the multi-cell converter apparatus 200 according to the present embodiment.

FIG. 3 shows an exemplary configuration of the multi-cell converter apparatus 200 according to the present embodiment. The multi-cell converter apparatus 200 shown in FIG. 3 is an example that includes a plurality of AC/DC converting cells and converts an AC voltage input supplied from an AC power supply 210 into DC voltage. The multi-cell converter apparatus 200 transmits a power supply voltage, a control signal, and/or the like by using a cascade connection for a plurality of isolating components. The multi-cell converter apparatus 200 includes a reactor 220, a plurality of AC/DC converting cells that include a first AC/DC converting cell 230, a second AC/DC converting cell 240, and a third AC/DC converting cell 250, a power supply section 260, an isolating component 270, an isolating component 370, and a control apparatus 280.

The reactor 220 has one end connected to the AC power supply 210, and smooths the voltage input thereto. The other end of the reactor 220 is connected to one input terminal of the first AC/DC converting cell 230. The plurality of AC/DC converting cells including the first AC/DC converting cell 230, the second AC/DC converting cell 240, and the third AC/DC converting cell 250 each convert the AC voltage input between the two input terminals thereof into a DC voltage and output this DC voltage.

The other input terminal of the first AC/DC converting cell 230 is connected to one input terminal of the second AC/DC converting cell 240. The other input terminal of the second AC/DC converting cell 240 is connected to the one input terminal of the following AC/DC converting cell. In this way, among the plurality of AC/DC converting cells, the one input terminal of one AC/DC converting cell is connected to the other input terminal of another AC/DC converting cell, and the other input terminal of the third AC/DC converting cell 250 arranged last is connected to the AC power supply 210. In other words, the AC sides of the plurality of AC/DC converting cells are connected in series to the AC power supply 210.

The first AC/DC converting cell 230 includes an AC/DC converting section 232, a capacitance element 234, and a DC/DC converting section 236. The AC/DC converting section 232 converts the AC voltage that has been smoothed by the reactor 220 into DC voltage, and outputs this DC voltage. The capacitance element 234 discharges, to a later stage, the DC voltage obtained by smoothing the voltage output from the AC/DC converting section 232.

The DC/DC converting section 236 has the DC voltage output by the capacitance element 234 input thereto, and outputs a predetermined DC voltage. For example, the DC/DC converting section 236 pulls up or pulls down the voltage after converting the DC voltage input thereto into alternating current therein, and outputs a predetermined DC voltage. In this way, since the first AC/DC converting cell 230 includes the DC/DC converting section 236 on the DC side, the first AC/DC converting cell 230 can output DC voltage that is electrically isolated from the AC voltage input from the AC side. The first AC/DC converting cell 230 further includes a drive circuit for driving the AC/DC converting section 232 and the DC/DC converting section 236.

FIG. 3 shows an example in which the plurality of AC/DC converting cells have substantially the same circuit configuration. In other words, the second AC/DC converting cell 240 includes an AC/DC converting section 242, a capacitance element 244, a DC/DC converting section 246, and a drive circuit, and outputs a predetermined DC voltage. Furthermore, the third AC/DC converting cell 250 includes an AC/DC converting section 252, a capacitance element 254, a DC/DC converting section 256, and a drive circuit, and outputs a predetermined DC voltage. Similarly, the plurality of AC/DC converting cells include AC/DC converting sections, capacitance elements, DC/DC converting sections, and drive circuits, and output predetermined DC voltages.

In the manner described above, the plurality of AC/DC converting cells include a plurality of DC/DC converting sections on the DC side, and can therefore output the DC voltage electrically isolated from the AC voltage input from the AC side. Here, the plurality of AC/DC converting cells may each output substantially the same DC voltage $V_{out}$. In this case, as shown in the example of FIG. 3, by connecting the outputs of the plurality of DC/DC converting sections on the DC side in parallel, it is possible to realize the operation of the multi-cell converter apparatus 200 with a large current output.

The power supply section 260 supplies power supply voltage to each of the plurality of AC/DC converting cells. Since the reference potentials of the plurality of AC/DC converting cells are different for each AC/DC converting cell, the power supply section 260 supplies the power supply voltage while maintaining electrical isolation between the AC/DC converting cells. The power supply section 110 supplies each power supply voltage to the drive circuits via a plurality of isolating components 270.

The control apparatus 280 supplies a control signal to the drive circuit of each AC/DC converting cell. Since the reference potential is different for the drive circuit of each AC/DC converting cell, the control apparatus 280 supplies the control signals while maintaining electrical isolation between the AC/DC converting cells. The control apparatus 280 supplies the drive circuits with the control signals via a plurality of isolating components 370, in a similar manner as the power supply section 260.

The plurality of isolating components 270 and isolating components 370 are connected in cascade, and each isolating component transmits a potential difference input thereto to a later stage, while providing isolation between the input and the output. The number of isolating components 270 and isolating components 370 connected in cascade corresponds to the number of AC/DC converting cells. For example, the number of isolating components 270 and isolating components 370 connected in cascade is the same as the number of AC/DC converting cells. As shown in the example of FIG. 3, the plurality of isolating components 270 connected in cascade each supply one corresponding AC/DC converting cell with the power supply voltage every time this power supply voltage is transmitted by one isolating component 270 from the power supply section 260. Furthermore, the plurality of isolating components 370 connected in cascade each supply one corresponding AC/DC converting cell with the control signal every time this control signal is transmitted by one isolating component 370 from the control apparatus 280.

Instead of this, the number of isolating components 270 and/or isolating components 370 connected in cascade may be a ratio of one isolating component for every n AC/DC converting cells. Here, n is a natural number greater than or equal to 2. In this case, the plurality of isolating components 270 connected in cascade each supply the power supply voltage to the corresponding n AC/DC converting cells every time this power supply voltage is transmitted by one isolating component 270 from the power supply section 260. Similarly, the plurality of isolating components 370 connected in cascade each supply the control signal to the corresponding n AC/DC converting cells every time this control signal is transmitted by one isolating component 370 from the control apparatus 280. The plurality of isolating components 270 and isolating components 370 are isolating transformers, pulse transformers, digital isolators, isolation amplifiers, and the like, for example.

In the manner described above, in the multi-cell converter apparatus 200 according to the present embodiment, the AC sides of the plurality of AC/DC converting cells are connected in series to the AC power supply 210, and therefore by adjusting the drive timing of each component, in a similar manner as the AC/DC converter 100 described in FIGS. 1 and 2, the withstand voltage of each AC/DC converting cell can be reduced. Accordingly, the multi-cell converter apparatus 200 can provide a plurality of AC/DC converting cells that realize miniaturization, reduced cost, high efficiency, and the like.

The multi-cell converter apparatus 200 according to the present embodiment supplies the plurality of AC/DC converting cells with the power supply voltage and the control signals using the plurality of isolating components 270 and isolating components 370. The following describes the transmission of the power supply voltage of the power supply section 260 by the plurality of isolating components 270 and isolating components 370.

Figure 4:
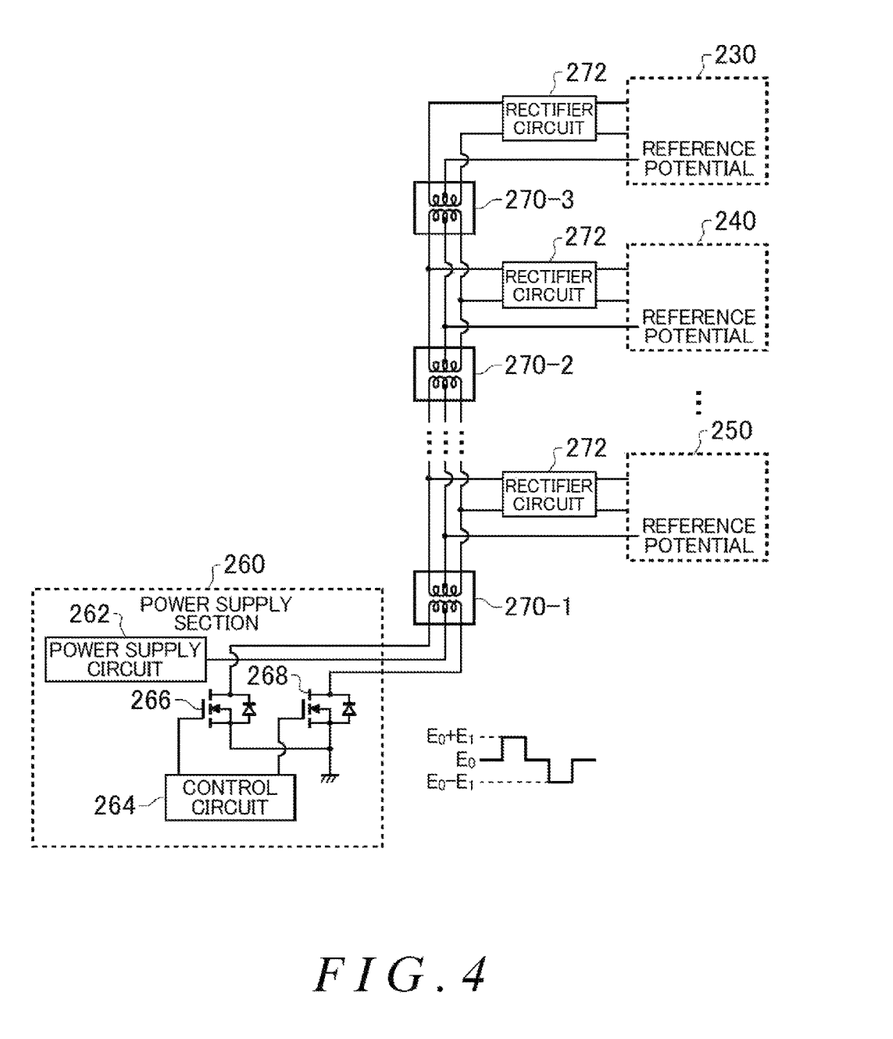
FIG. 4 shows an exemplary configuration in which a plurality of the isolating components 270 according to the present embodiment transmit the power supply voltage from the power supply section 260 to a plurality of AC/DC converting cells.

FIG. 4 shows an exemplary configuration in which a plurality of the isolating components 270 according to the present embodiment transmit the power supply voltage from the power supply section 260 to a plurality of AC/DC converting cells. In the present embodiment, an example is described in which each isolating component 270 includes an isolating transformer providing isolation between the input and the output. Each isolating transformer includes a middle terminal between the two input terminals on the input side, and includes a middle terminal between the two output terminals on the output side.

The power supply section 260 operates as an AC power supply. FIG. 4 shows an example in which the power supply section 260 uses a constant potential $E_0$ as a reference, and outputs AC voltage with an amplitude voltage $E_1$. The power supply section 260 includes a power supply circuit 262, a control circuit 264, a first switch 266, and a second switch 268.

The power supply circuit 262 is a DC power supply, and generates and outputs a predetermined DC voltage $E_1$. The power supply circuit 262 supplies the DC voltage $E_1$ to the middle terminal on the input side of the isolating component 270-1 arranged at one end (i.e. at the first stage of the cascade connection as seen from the power supply section 260), from among the isolating components 270 connected in cascade.

The control circuit 264 controls the switching of the first switch 266 and the second switch 268. For example, the control circuit 264 performs control to set one of the first switch 266 and the second switch 268 in the connected state and the other in the disconnected state. In this case, the control circuit 264 controls the switching of the first switch 266 and the second switch 268 according to a predetermined constant frequency.

The first switch 266 and the second switch 268 switch the electrical connection and disconnection at the one end and the other end of each switch, according to the switching signal supplied from the control circuit 264. The first switch 266 and the second switch 268 are preferably semiconductor switches. The first switch 266 and the second switch 268 include semiconductor switches such as MOSFETs, IGBTs, and BJTs, for example.

As an example, the first switch 266 has one input terminal of the first stage isolating component 270-1 connected to the drain terminal thereof, has a constant potential $E_0$ connected to the source terminal thereof, and switches the electrical connection between the drain terminal and the source terminal according to the switching signal supplied to the gate terminal thereof. Furthermore, as an example, the second switch 268 has the other input terminal of the first state isolating component 270-1 connected to the drain terminal thereof, has the constant potential $E_0$ connected to the source terminal thereof, and switches the electrical connection between the drain terminal and the source terminal according to the switching signal supplied to the gate terminal thereof.

In this way, as one example, the power supply section 260 switches with a constant period between supplying a power supply voltage $E_0+E_1$ between the middle terminal and the one input terminal of the first-stage isolating component 270-1 and supplying a power supply voltage $E_0$-$E_1$ between the middle terminal and the other input terminal. Among the plurality of isolating components 270 connected in cascade, the power supply voltage from such a power supply section 260 is input between the input terminals of the isolating component 270-1 connected to the one end of the cascade connection, and this power supply voltage is transmitted to the isolating components 270 at the second stage and onward. Each isolating component 270 may pull up or pull down the power supply voltage input thereto, and transmit the resulting voltage.

Each isolating component 270 connected in cascade supplies the power supply voltage to the one corresponding AC/DC converting cell every time the power supply voltage is transmitted using the one isolating component 270. Furthermore, each AC/DC converting cell has a terminal that is the reference potential inside the AC/DC converting cell connected to the terminal of the corresponding isolating component 270 among the plurality of isolating components 270. In this case, the isolating transformers, which are the isolating components 270, have the middle terminals connected to the corresponding AC/DC converting cells among the plurality of AC/DC converting cells.

As shown in FIG. 2, when each AC/DC converting cell switches the switch elements therein according to the corresponding timing, each potential therein may fluctuate according to the switching timing. In this case, in each AC/DC converting cell, the potential serving as a reference may also fluctuate according to the switching timing. Therefore, by connecting the terminal that is the reference potential and the middle terminal of the isolating component 270 for every AC/DC converting cell, even when this reference potential fluctuates, the isolating component 270 causes the potential of the middle terminal and this reference potential to match, and can supply the corresponding AC/DC converting cell with the potential difference (i.e. the power supply voltage) using this reference potential as a reference.

In this way, in each AC/DC converting cell in the present embodiment, the potential serving as the reference for the presence of fluctuation according to the switching timing is expressed as the "reference potential." In other words, the reference potential in each AC/DC converting cell is not limited to a potential that is a substantially constant potential compared to the potential that is the reference for the entire apparatus, such as a ground potential, but includes a potential that is a reference for circuit operation in each cell even when there is fluctuation according to the switching operation of the switch elements, for example.

FIG. 4 shows an example in which the output terminal of the first-stage isolating component 270-1 supplies the power supply voltage to the third AC/DC converting cell 250, and the middle terminal on the output side of the isolating component 270-1 is connected to the reference potential of the third AC/DC converting cell 250. Furthermore, the output terminal of the first-stage isolating component 270-1 is connected to the input terminal of the second-stage isolating component 270. In this way, the third AC/DC converting cell 250 is isolated between the first stage isolating component 270-1 and the second stage isolating component, and is supplied with a power supply voltage that is level-shifted according to the reference potential.

A rectifier circuit 272 may be provided between the first stage isolating component 270-1 and the third AC/DC converting cell 250. The rectifier circuit 272 may be a circuit that performs half-wave rectification or full-wave rectification, and forms a circuit that has four diodes, as shown by the rectifying section 20 described in FIG. 1, for example.

Furthermore, FIG. 4 shows an example in which, when the number of isolating components is m, the output terminal of the (m−1)-th stage isolating component 270-2 supplies the power supply voltage to the second AC/DC converting cell 240, and the middle terminal on the output side of the isolating component 270-2 is connected to the reference potential of the second AC/DC converting cell 240. Yet further, the output terminal of the (m−1)-th stage isolating component 270-2 is connected to the input terminal of the m-th stage isolating component 270-3. In this way, the second AC/DC converting cell 240 is isolated between the (m−1)-th stage isolating component 270-2 and the m-th stage isolating component 270-3, and is supplied with the power supply voltage that is level-shifted according to the reference potential.

Similarly, the output terminal of the m-th stage isolating component 270-3 supplies the power supply voltage to the first AC/DC converting cell 230, and the middle terminal on the output side of the isolating component 270-3 is connected to the reference potential of the first AC/DC converting cell 230. In this way, the first AC/DC converting cell 230 is isolated by the m-th stage isolating component 270-3, and is provided with the power supply voltage that is level-shifted according to the reference potential.

In this way, each isolating component 270 has the middle terminal connected to the reference potential of the corresponding AC/DC converting cell, and has the output terminal supply the power supply voltage to this corresponding AC/DC converting cell. In this way, the plurality of isolating components 270 can supply power supply voltages that correspond to the respective reference potentials to the corresponding AC/DC converting cells.

Here, an example is considered in which the multi-cell converter apparatus 200 in which three AC/DC converting cells are connected in series is supplied by the AC power supply 210 with AC voltage having a maximum amplitude value of 2.4 kV. In this case, when a value of substantially 2.64 kV is set in consideration of margin of approximately 10% for the input voltage fluctuation range of the DC voltage, the maximum value of the voltage fluctuation amount of the reference potential of each AC/DC converting cell is approximately 2.64 kV/3=880 V. In this case, the (first) AC/DC converting cell corresponding to the AC voltage in an approximate range from 0 V to 800 V of the AC power supply 210 connects the terminal having this reference potential to the middle terminal of the first stage isolating component 270, thereby matching the potential inside the cell. In this way, the first stage isolating component 270 can supply the drive circuit of the first AC/DC converting cell with the power supply voltage that matches the reference potential of the first AC/DC converting cell.

In this case, the (second) AC/DC converting cell corresponding to the AC voltage in an approximate range from 800 V to 1.6 kV of the AC power supply 210 connects the terminal having the reference potential inside this cell to the middle terminal of the second stage isolating component 270. In this way, the second stage isolating component 270 can supply the drive circuit of the second AC/DC converting cell with the power supply voltage that matches the reference potential of the second AC/DC converting cell. Similarly, the (third) AC/DC converting cell corresponding to the AC voltage in an approximate range from 1.6 kV to 2.4 kV of the AC power supply 210 connects the terminal having the reference potential inside this cell to the middle terminal of the third stage isolating component 270. In this way, the third stage isolating component 270 can supply the drive circuit of the third AC/DC converting cell with the power supply voltage that matches the reference potential of the third AC/DC converting cell.

In other words, even when the AC power supply 210 outputs an AC voltage of 2.4 kV, each isolating component 270 has added thereto a voltage with an approximate range of 900 V added to one AC/DC converting cell, even when there is a voltage fluctuation. Accordingly, as long as each isolating component 270 has a withstand voltage that is approximately in the voltage range added to one AC/DC converting cell, it is possible to reduce the withstand voltage compared to the output voltage of the AC power supply 210. In the manner described above, by connecting a plurality of isolating components 270 in cascade and receiving reference potentials from corresponding AC/DC converting cells, the multi-cell converter apparatus 200 according to the present embodiment can supply power supply voltages that are level-shifted to the corresponding AC/DC converting cells while allowing a reduction of the withstand voltage of each isolating component 270.

Figure 5:
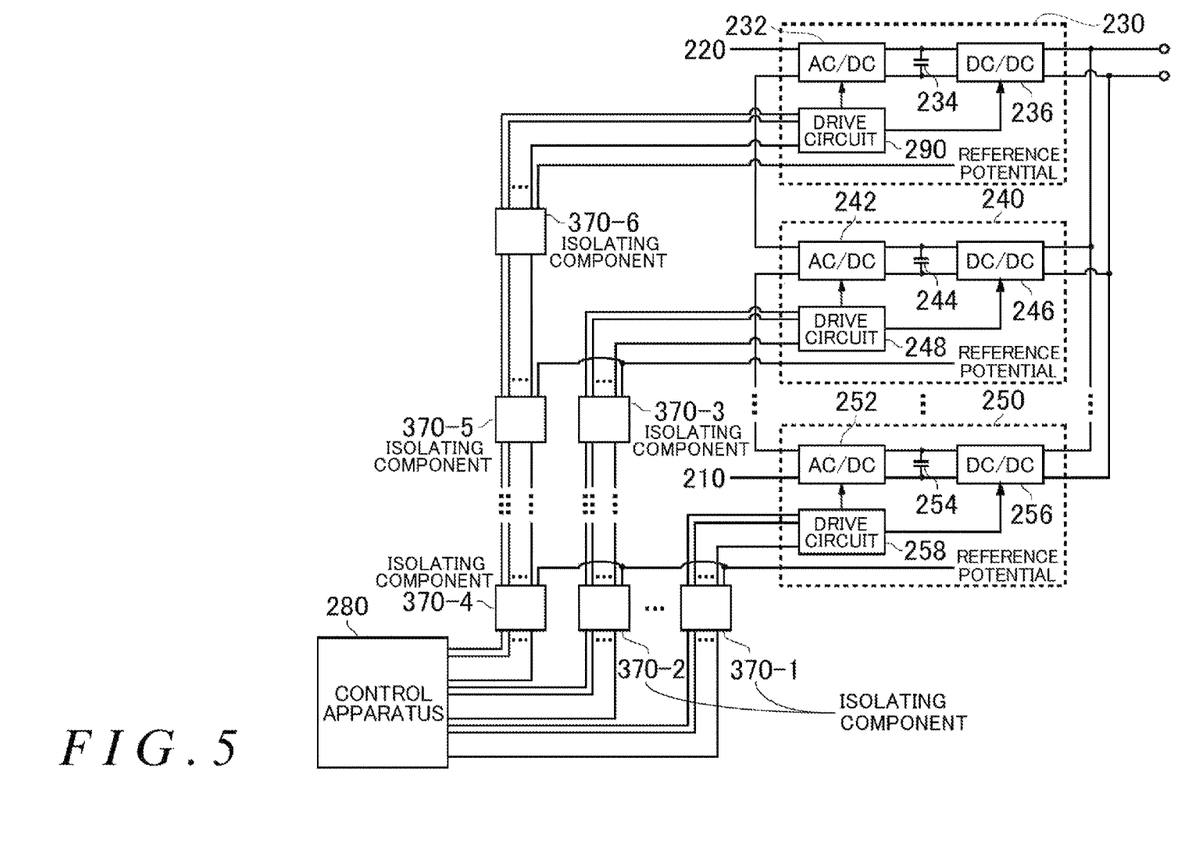
FIG. 5 shows an exemplary configuration in which the plurality of isolating components 270 according to the present embodiment transmit the control signal from the control apparatus 280 to the plurality of AC/DC converting cells.

The following describes the transmission of the control signals of the control apparatus 280 by the plurality of isolating components 370. FIG. 5 shows an exemplary configuration in which the plurality of isolating components 370 according to the present embodiment transmit the control signals from the control apparatus 280 to the plurality of AC/DC converting cells. In FIG. 5, an example is shown in which the plurality of isolating components 370 include digital isolators. In other words, since the plurality of isolating components 370 transmit control signals with low power compared to the power supply voltage, it is possible to use isolating components that are smaller and have lower capacitance. In a similar manner as shown in FIG. 4, the plurality of isolating components 370 are connected in cascade and form a plurality of transmission paths that are connected between the control apparatus 280 and each AC/DC converting cell.

One transmission path formed by connecting a plurality of isolating components 370 in cascade transmits one control signal. For example, when transmitting a plurality of control signals from the control apparatus 280 to one AC/DC converting cell, the plurality of isolating components 370 form a plurality of transmission paths. Components such as digital isolators can be integrated, and therefore it is possible to easily form a plurality of transmission paths by a plurality of isolator ICs connected in cascade. FIG. 5 shows an example in which each isolating component 370 includes a plurality of digital isolators, and transmits a different signal for each digital isolator.

Here, the control apparatus 280 may supply a different control signal for each AC/DC converting cell, and the plurality of isolating components 370 may form a plurality of transmission paths for each AC/DC converting cell. FIG. 5 shows an example in which the isolating component 370-1 forms a plurality of transmission paths that supply a plurality of control signals to the third AC/DC converting cell 250. The isolating component 370-1 supplies isolated control signals to the third AC/DC converting cell 250, and the third AC/DC converting cell 250 connects the terminal having the reference potential to the terminal corresponding to the isolating component 370-1. In this way, the third AC/DC converting cell 250 can receive control signals that are level-shifted according to the reference potential. Furthermore, the withstand voltage of the isolating component 370-1 can be reduced to approximately the withstand voltage of the components used in the third AC/DC converting cell 250.

The third AC/DC converting cell 250 includes a drive circuit 258, and receives control signals from the isolating component 370-1. In other words, in a similar manner as shown in FIG. 4, the drive circuit 258 operates according to the power supply voltage received from the power supply section 260, and controls the AC/DC converting section 252 and the DC/DC converting section 256 based on the control signals received from the control apparatus 280 via the isolating component 370-1. In this case, the DC/DC converting section 256 may receive the power supply voltage from the power supply section 260, in a similar manner as the AC/DC converting section 252.

Furthermore, FIG. 5 shows an example in which the plurality of isolating components from the isolating component 370-2 to the isolating component 370-3 are connected in cascade, and a plurality of signal paths are formed that supply a plurality of control signals to the second AC/DC converting cell 240. In this case as well, the isolating component 370-3 supplies the control signals to the second AC/DC converting cell 240, and the second AC/DC converting cell 240 connects the terminal having the reference potential to the terminal corresponding to the isolating component 370-3. In this way, the second AC/DC converting cell 240 can receive the control signals that are level-shifted according to the reference potential. In this case, in a similar manner as the third AC/DC converting cell 250, the second AC/DC converting cell 240 includes the drive circuit 248 and receives the control signals from the isolating component 370-3.

Among the plurality of isolating components 370 forming the transmission paths, isolating components 370 other than the isolating components 370 arranged at the end portions are also respectively connected to the reference potentials of corresponding AC/DC converting cells. For example, the isolating component 370-2 receives the reference potential from the third AC/DC converting cell 250. In this way, by receiving each corresponding reference voltage, the plurality of isolating components 370 can level-shift each voltage, and therefore the withstand voltages of these isolating components 370 can be reduced to approximately the withstand voltages of the components used in the corresponding AC/DC converting cells.

Furthermore, FIG. 5 shows an example in which the plurality of isolating components from the isolating component 370-4 to the isolating component 370-6 are connected in cascade, and a plurality of signal paths are formed that supply a plurality of control signals to the first AC/DC converting cell 230. The isolating component 370-6 supplies the control signals to the first AC/DC converting cell 230, and the first AC/DC converting cell 230 connects the terminal having the reference potential to the terminal corresponding to the isolating component 370-6. In this way, the first AC/DC converting cell 230 can receive the control signals that are level-shifted according to the reference potential. In this case, in a similar manner as the third AC/DC converting cell 250, the first AC/DC converting cell 230 includes the drive circuit 290 and receives the control signals from the isolating component 370-6.

Other isolating components 370 forming transmission paths are each connected to the reference potential of a corresponding AC/DC converting cell. For example, the third AC/DC converting cell 250 connects the reference potential to the isolating component 370-4, and the second AC/DC converting cell 240 connects the reference potential to the isolating component 370-5. In this way, the withstand voltages of the plurality of isolating components 370 from the isolating component 370-4 to the isolating component 370-6 can be reduced to be approximately the withstand voltages of the components used in the corresponding AC/DC converting cells.

In the manner described above, in at least one transmission path among the plurality of transmission paths formed by connecting a plurality of isolating components 370 in cascade, the isolating component 370 connected to one end of the cascade connection inputs the control signal from the control apparatus 280 to the primary side. Then, each isolating component 370 receives the respective reference potential from the corresponding AC/DC converting cell. In this way, the isolating component 370 connected to the other end of the cascade connection supplies the control signals corresponding to the respective reference potentials to the corresponding AC/DC converting cells. Accordingly, the multi-cell converter apparatus 200 can supply the control signals to the corresponding AC/DC converting cells while allowing a reduction of the withstand voltage of each isolating component 370. The following describes the operation inside an AC/DC converting cell based on such a control signal.

Figure 6:
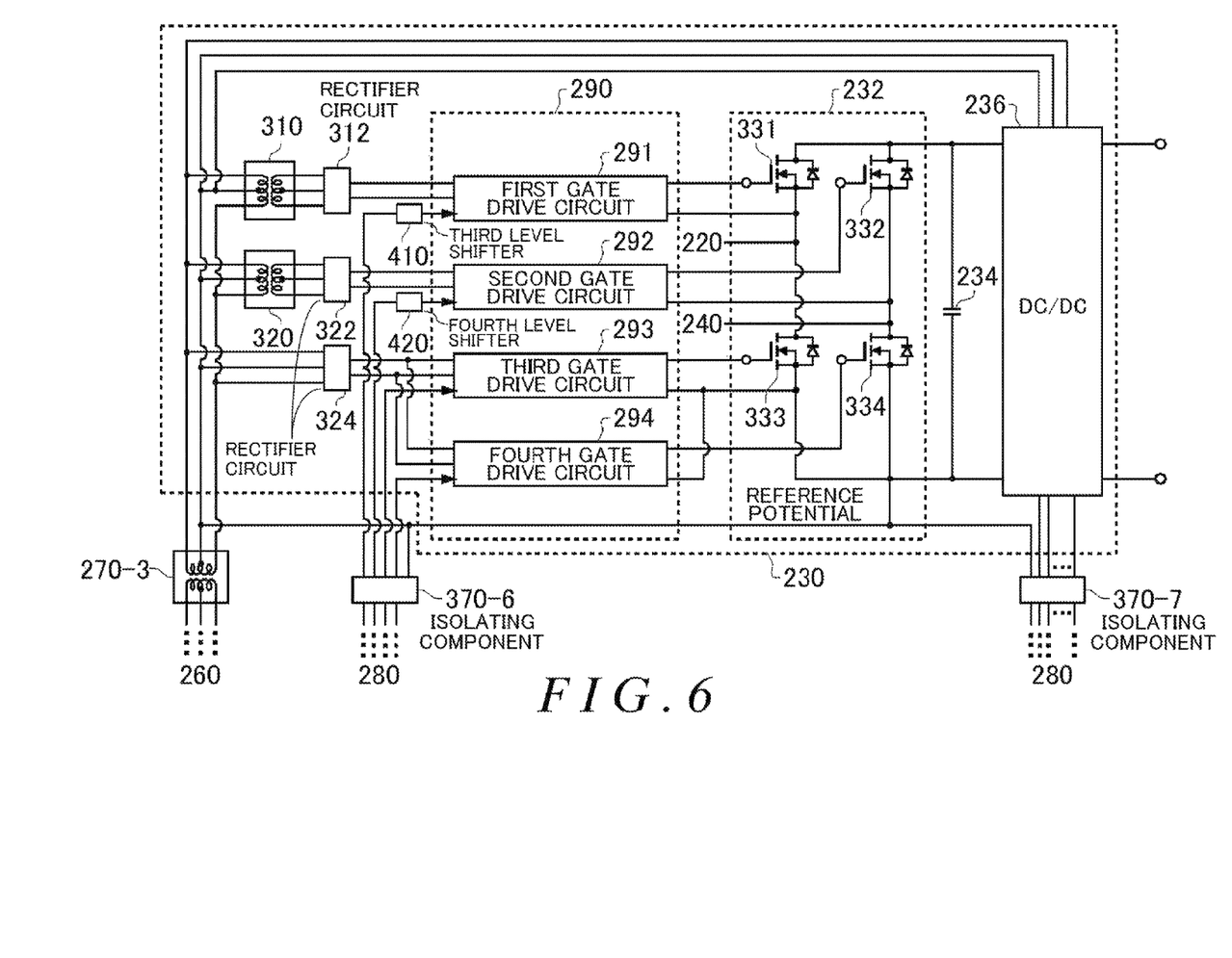
FIG. 6 shows an exemplary configuration of the first AC/DC converting cell 230 according to the present embodiment.

FIG. 6 shows an exemplary configuration of the first AC/DC converting cell 230 according to the present embodiment. As described in FIG. 4, the first AC/DC converting cell 230 is supplied with the power supply voltage from the power supply section 260 via the plurality of isolating components 270 connected in cascade. FIG. 6 shows an example in which the power supply voltage is supplied to the first AC/DC converting cell 230 from the isolating component 270-3 at the final stage in the cascade connection. Furthermore, FIG. 6 shows an example in which the power supply voltage from the isolating component 270-3 is also supplied to the DC/DC converting section 236, in addition to the drive circuit 290. In this way, the plurality of isolating components 270 may supply the power supply voltages corresponding to the respective reference potentials to the corresponding DC/DC converting sections 236 among the plurality of DC/DC converting sections 236.

As described in FIG. 5, the drive circuit 290 of the first AC/DC converting cell 230 receives the control signals from the control apparatus 280 via a plurality of isolating components 370 connected in cascade. FIG. 6 shows an example in which the control signals from the isolating component 370-6 at the final stage of the cascade connection are supplied to the first AC/DC converting cell 230. Furthermore, the first AC/DC converting cell 230 connects the reference potential to the corresponding isolating component 270-3 and isolating component 370-6.

FIG. 6 shows an example in which the AC/DC converting section 232 includes s first switch element 331, a second switch element 332, a third switch element 333, and a fourth switch element 334. The first switch element 331, the second switch element 332, the third switch element 333, and the fourth switch element 334 are preferably semiconductor switches. The first switch element 331, the second switch element 332, the third switch element 333, and the fourth switch element 334 include semiconductor switches such as MOSFETs, IGBTs, and BJTs, for example.

In a case where the AC/DC converting section 232 includes a plurality of such switch elements, the drive circuit 290 generates each drive signal for driving one of these switch elements, and supplies the drive signals to the switch elements. The drive circuit 290 includes a first gate drive circuit 291, a second gate drive circuit 292, a third gate drive circuit 293, and a fourth gate drive circuit 294, for example.

The first gate drive circuit 291 generates a drive signal (e.g. a gate-source voltage) for driving the first switch element 331, and supplies this first switch element 331 with the drive signal. The second gate drive circuit 292 generates a drive signal for driving the second switch element 332, and supplies this second switch element 332 with the drive signal. The third gate drive circuit 293 generates a drive signal for driving the third switch element 333, and supplies this third switch element 333 with the drive signal. The fourth gate drive circuit 294 generates a drive signal for driving the fourth switch element 334, and supplies this fourth switch element 334 with the drive signal.

In the manner described above, when the AC/DC converting section 232 includes a plurality of switch elements, the reference potential of the drive signal for driving each switch is different. In the case of the example shown in FIG. 6, the drive signal for driving the first switch element 331, the drive signal for driving the second switch element 332, and the drive signals for driving the third switch element 333 and the fourth switch element 334 have respectively different signals as references. In this case, isolated drive signals are preferably generated within the first AC/DC converting cell 230 as well.

Therefore, each AC/DC converting cell includes a level shifter that level-shifts the voltages of at least some of the power supply voltages received from the power supply section 260. FIG. 6 shows an example in which the first AC/DC converting cell 230 includes a first level shifter 310 and a second level shifter 320.

The first level shifter 310 has an input side that is connected to the isolating component 270-3 and an output end that is connected to the first gate drive circuit 291. A rectifier circuit 312 may be provided between the first level shifter 310 and the first gate drive circuit 291. The second level shifter 320 has an input side that is connected to the isolating component 270-3 and an output side that is connected to the second gate drive circuit 292. A rectifier circuit 322 may be provided between the second level shifter 320 and the second gate drive circuit 292.

The first level shifter 310 and the second level shifter 320 are isolating components such as isolating transformers, pulse transformers, and digital isolators. The first level shifter 310 and the second level shifter 320 are provided in the transmission path that supplies the power needed to switch the first switch element 331 and the second switch element 332 ON and OFF, and therefore it is possible to use components with approximately the same or smaller sizes and capacitances compared to the isolating component 270. In this way, it is possible to generate drive signals with different reference potentials in the first AC/DC converting cell 230, without further using a DC/DC converter or the like.

The above describes an example in which the first AC/DC converting cell 230 includes the first level shifter 310 and the second level shifter 320, and supplies the power supply voltage to the drive circuit 290. In addition, the first AC/DC converting cell 230 further includes a level shifter, and supplies control signals from the control apparatus 280 to the first gate drive circuit 291 and the second gate drive circuit 292. FIG. 6 shows an example in which the first AC/DC converting cell 230 includes a third level shifter 410 and a fourth level shifter 420.

The third level shifter 410 has an input side connected to the isolating component 370-6 and an output side connected to the first gate drive circuit 291. The fourth level shifter 420 has an input side connected to the isolating component 370-6 and an output side connected to the second gate drive circuit 292. The third level shifter 410 and the fourth level shifter 420 are isolating components such as isolating transformers, pulse transformers, and digital isolators. The third level shifter 410 and the fourth level shifter 420 may use components with approximately the same or smaller sizes and capacitances compared to the isolating component 270.

The third gate drive circuit 293 and the fourth gate drive circuit 294 operate with the reference potential of the first AC/DC converting cell 230, and therefore there is no need to provide level shifters. In other words, the third gate drive circuit 293 and the fourth gate drive circuit 294 may be connected to the isolating component 270-3 and may receive the power supply voltage. Furthermore, the third gate drive circuit 293 and the fourth gate drive circuit 294 may be connected to the isolating component 370-6 and may receive the control signals.

A rectifier circuit 324 may be provided between the third gate drive circuit 293 and fourth gate drive circuit 294 and the isolating component 270-3. The rectifier circuit 312, the rectifier circuit 322, and the rectifier circuit 324 may be circuits that perform half-wave rectification or full-wave rectification, and form circuits including four diodes such as shown by the rectifying section 20 described in FIG. 1, for example.

The DC/DC converting section 236 of the first AC/DC converting cell 230 may receive the control signals from the control apparatus 280 via a plurality of isolating components 370 connected in cascade. FIG. 6 shows an example in which the control signals from the isolating component 370-7 at the final stage in the cascade connection are supplied to the DC/DC converting section 236. In this case as well, the first AC/DC converting cell 230 connects the reference potential to the isolating component 370-7.

In the manner described above, the multi-cell converter apparatus 200 according to the present embodiment uses the plurality of isolating components 270 and isolating components 370 to supply the power supply voltages and control signals to the plurality of AC/DC converting cells, and can realize miniaturization, lower cost, higher efficiency, and the like. The multi-cell converter apparatus 200 can form the transmission paths for the electric signals using the plurality of isolating components 270 and isolating components 370, and therefore the signals being transmitted are not limited by the power supply and the control signals. For example, it is possible to use the plurality of isolating components 270 for the transmitting and receiving of detection signals that detect abnormalities in the AC/DC converting cells. The following describes such a multi-cell converter apparatus 200.

Figure 7:
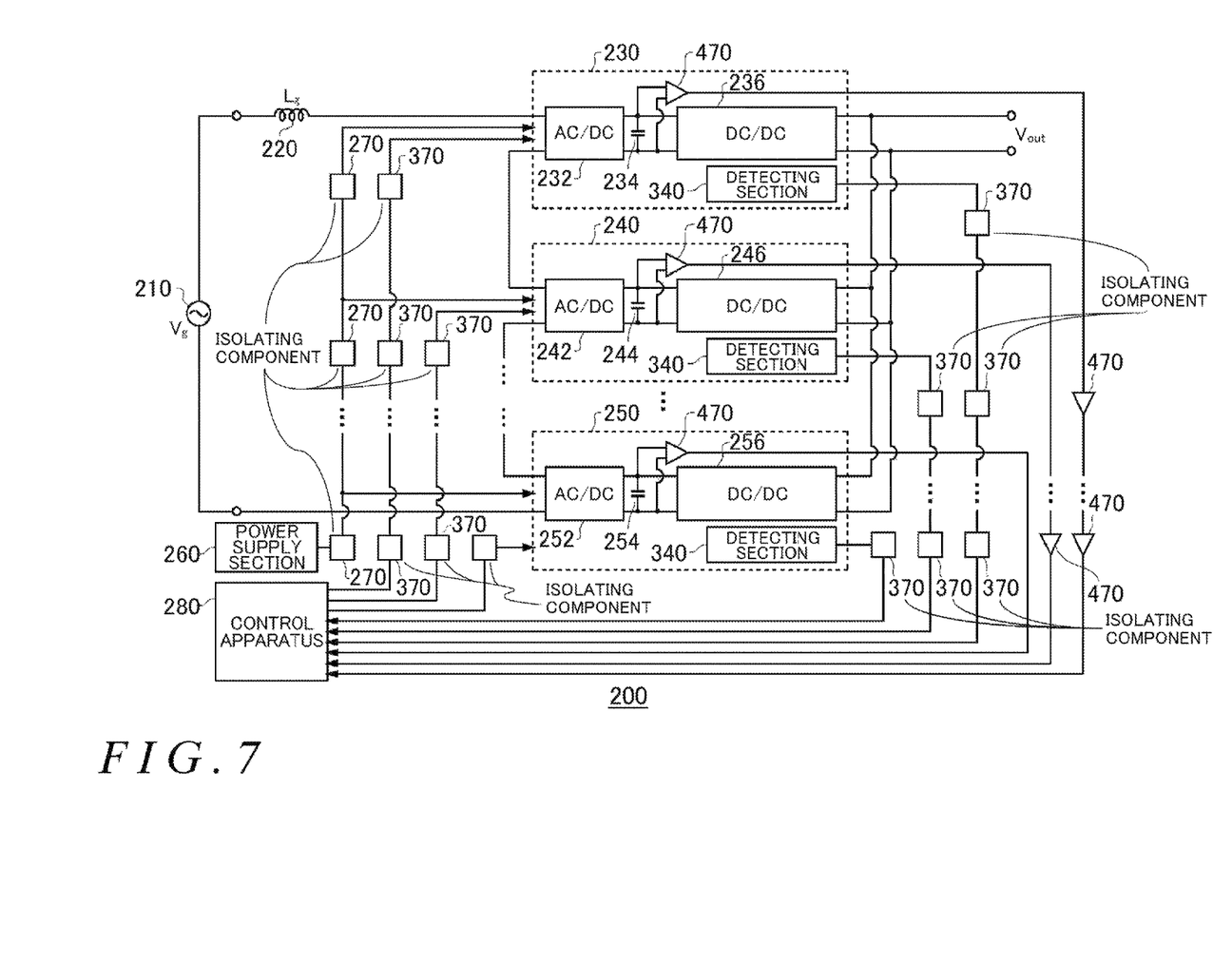
FIG. 7 shows a modification of the multi-cell converter apparatus 200 according to the present embodiment.

FIG. 7 shows a modification of the multi-cell converter apparatus 200 according to the present embodiment. In the multi-cell converter apparatus 200 according to the present modification, components having substantially the same operation as components in the multi-cell converter apparatus 200 according to the embodiment shown in FIG. 3 are given the same reference numerals, and descriptions thereof are omitted. FIG. 7 shows an example in which the plurality of AC/DC converting cells include detecting sections 340 that detect malfunctions in each AC/DC converting cell.

The detecting section 340 outputs a detection signal providing notification that a malfunction has been detected in the AC/DC converting cell. For example, the detecting section 340 detects that the power supply voltage is not being supplied, that overcurrent is flowing, that DC voltage is not being output, that the voltage range of the DC voltage being output is not within a predetermined voltage range, and the like.

In order to transmit the detection signal of such a detecting section 340 to the control apparatus 280, at least one transmission path among the plurality of transmission paths formed by the plurality of isolating components 370 transmits an electric signal from one AC/DC converting cell to the control apparatus 280. In other words, among the plurality of isolating components 370 connected in cascade, the isolating component 370 connected at one end of the cascade connection is connected to one AC/DC converting cell, and receives the electric signal output by one AC/DC converting cell. The isolating component 370 connected at the other end of the cascade connection is connected to the control apparatus 280, and supplies the control apparatus 280 with the electric signal received from one AC/DC converting cell.

In this way, by having the detecting section 340 output the detection signal as an electric signal to the isolating component 370 connected at one end of the cascade connection, the control apparatus 280 can receive this detection signal. FIG. 7 shows an example in which the first AC/DC converting cell 230, the second AC/DC converting cell 240, and the third AC/DC converting cell 250 are each connected to the control apparatus 280, and three transmission paths are formed. Each isolating component 370 forming a transmission path is connected to the reference voltage of the corresponding AC/DC converting cell.

The control apparatus 280 can receive such detection signals from the AC/DC converting cells, and can therefore stop abnormal operation of this multi-cell converter apparatus 200. The control apparatus 280 stops the control operation of all of the AC/DC converting cells, in response to receiving a detection signal providing notification that a malfunction was detected in one or more AC/DC converting cells among the plurality of AC/DC converting cells, for example.

Instead of this, in a case where an electric signal indication normal operation is received from an AC/DC converting cell, the control apparatus 280 may stop the operation of the AC/DC converting cell in response to not receiving such an electric signal. In the manner described above, the multi-cell converter apparatus 200 can quickly stop the continuation of abnormal operation, out-of-control operation, and the like. The control apparatus 280 may stop the operation of the AC/DC converting cell, and then provide a display or notification to the outside indicating that the abnormality has been stopped.

The above describes an example in which the multi-cell converter apparatus 200 of the present modification detects abnormalities in the AC/DC converting cells, but the multi-cell converter apparatus 200 is not limited to this. The multi-cell converter apparatus 200 can form transmission paths for electric signals using a plurality of isolating components, and therefore may be used to detect and adjust electrical characteristics of AC/DC converting cells, for example. As an example, the multi-cell converter apparatus 200 may be used to detect a delay, correct this delay, and the like for transmission signals of AC/DC converting cells. Furthermore, the multi-cell converter apparatus 200 may be used to detect, adjust, and the like the analog amount of each component in AC/DC converting cells.

FIG. 7 shows an example of transmitting such analog amounts using a plurality of isolating components 470. FIG. 7 shows an example in which each AC/DC converting cell includes an isolation amplifier that detects and transmits the voltage value at each end of the capacitance element, as the isolating component 470, and transmits the detection signals on a transmission path formed by a plurality of isolation amplifiers connected in cascade. For example, the first AC/DC converting cell 230 includes the isolating component 470. The isolating component 470 includes an isolation amplifier, has the end-to-end voltage of the capacitance element 234 input thereto, and outputs an electric signal corresponding to this end-to-end voltage. The isolating component 470 is connected to the reference voltage from the first AC/DC converting cell 230, and outputs the electric signal isolated from this reference voltage to an isolating component 470 at a later stage.

In a similar manner as the other insulating components, the isolating component 470 at the later stage is connected to the reference potential of the corresponding AC/DC converting cell and supplies the electric signal input thereto to the next isolating component 470. In this way, the control apparatus 280 can receive the detection result of the end-to-end voltage of the capacitance element from each AC/DC converting cell.

The multi-cell converter apparatus 200 in the present embodiment described above uses an isolating transformer that includes a middle terminal as an example of the isolating component 270 and the reference potential is connected to this middle terminal, but the present invention is not limited to this. As long as the potential on the secondary side of the isolating component 270 is determined by the AC/DC converting cell, the reference potential of the AC/DC converting cell may be connected to one of the output terminals of the isolating component 270.

The various embodiments of the present invention may be described with reference to a flow chart and a block diagram, in which case the blocks may represent (1) steps in a process by which an operation is performed or (2) "sections" of an apparatus that plays the role of performing the operation. The specific steps and "sections" (e.g. the control section, the control apparatus, the control circuit, the control step, and the like) may be implemented by a dedicated circuit, a programmable circuit provided together with computer readable instructions stored on a computer readable medium, and/or a process provided along with computer readable instructions stored on a computer readable medium. The dedicated circuit may include digital and/or analog hardware circuits, and may include an integrated circuit (IC) and/or a discreet circuit. The programmable circuit may include reconfigurable hardware circuits that include a logical AND, logical OR, logical XOR, logical NAND, logical NOR, and other logical functions, as well as memory elements and the like such as flip-flops, registers, field programmable arrays (FPGAs), and programmable logic arrays (PLAs).

The computer readable medium may include an arbitrary tangible device that can store instructions executed by a suitable device, and as a result, the computer readable medium including the instructions stored thereon includes a product that has instructions that can be executed in order to create a means for executing the operation designated by the flow chart or block diagram. Examples of the computer readable medium may include an electronic storage medium, a magnetic storage medium, an optical storage medium, an electromagnetic storage medium, a semiconductor storage medium, and the like. More specific examples of the computer readable medium include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), compact disc read-only memory (CD-ROM), a digital versatile disk (DVD), a Blu-ray (registered trademark) disk, a memory stick, a an integrated circuit card, or the like.

The computer readable instructions may be assembler instructions, instruction-set-architecture (ISA) instructions, machine instructions, machine dependent instructions, microcode, firmware instructions, state-setting data, or either source code or object code written in any combination of one or more programming languages including an object oriented programming language such as JAVA (registered trademark), Smalltalk, or C++, and conventional procedural programming languages such as the "C" programming language or similar programming languages.

The computer readable instructions are provided to a processor or programmable circuitry of a standard computer, a specialized computer, or another data programmable processing apparatus, locally or through a local area network (LAN) or a wide area network (WAN) such as the Internet, and may be executed to create the means for performing the operation designated by the flow chart or block diagram. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A multi-cell converter apparatus comprising:
   a plurality of AC/DC converting cells with AC sides that are connected in series to an AC power supply; and
   a plurality of isolating components that are connected in cascade and each transmit a potential difference input to a later stage while providing isolation between input and output, wherein
   each AC/DC converting cell has a terminal that is at a reference potential inside the AC/DC converting cell connected to a terminal of a corresponding isolating component among the plurality of isolating components,
   each isolating component includes an isolating transformer that provides isolation between the input and the output,
   each isolating transformer includes a middle terminal that is connected to the reference potential of the corresponding AC/DC converting cell among the plurality of AC/DC converting cells, and
   among the plurality of isolating components connected in cascade, a power supply voltage from a power supply section is input to the isolating component connected at one end of the cascade connection, and each isolating component supplies a power supply voltage corresponding to the reference potential to the corresponding AC/DC converting cell.

2. The multi-cell converter apparatus according to claim 1, wherein
each AC/DC converting cell includes a level shifter that level-shifts a voltage of at least some of the power supply voltages from the power supply section.

3. The multi-cell converter apparatus according to claim 1, wherein
the plurality of AC/DC converting cells include a plurality of DC/DC converting sections on a DC side.

4. The multi-cell converter apparatus according to claim 3, wherein
outputs of the plurality of DC/DC converting sections on the DC side are connected in parallel.

5. A multi-cell converter apparatus comprising:
a plurality of AC/DC converting cells with AC sides that are connected in series to an AC power supply; and
a plurality of isolating components that are connected in cascade and each transmit a potential difference input to a later stage while providing isolation between input and output, wherein
each AC/DC converting cell has a terminal that is at a reference potential inside the AC/DC converting cell connected to a terminal of a corresponding isolating component among the plurality of isolating components,
each isolating component includes an isolating transformer that provides isolation between the input and the output,
each isolating transformer includes a middle terminal that is connected to the reference potential of the corresponding AC/DC converting cell among the plurality of AC/DC converting cells,
the plurality of AC/DC converting cells include a plurality of DC/DC converting sections on a DC side, and
each isolating component supplies a power supply voltage corresponding to the reference potential to a corresponding DC/DC converting section among the plurality of DC/DC converting sections.

6. A multi-cell converter apparatus comprising:
a plurality of AC/DC converting cells with AC sides that are connected in series to an AC power supply; and
a plurality of isolating components that are connected in cascade and each transmit a potential difference input to a later stage while providing isolation between input and output, wherein
each AC/DC converting cell has a terminal that is at a reference potential inside the AC/DC converting cell connected to a terminal of a corresponding isolating component among the plurality of isolating components,
each isolating component includes an isolating transformer that provides isolation between the input and the output,
each isolating transformer includes a middle terminal that is connected to the reference potential of the corresponding AC/DC converting cell among the plurality of AC/DC converting cells,
the plurality of isolating components further form a plurality of transmission paths connecting between a control apparatus and each AC/DC converting cell among the plurality of AC/DC converting cells,
at least one transmission path among the plurality of transmission paths has a control signal from the control apparatus input to a primary side thereof by the isolating component connected at one end, from among the plurality of isolating components connected in cascade, and
each isolating component supplies a control signal corresponding to the reference potential to the corresponding AC/DC converting cell.

7. The multi-cell converter apparatus according to claim 6, wherein
at least one transmission path among the plurality of transmission paths transmits an electric signal from one AC/DC converting cell to the control apparatus,
among the plurality of isolating components connected in cascade, the isolating component connected at one end of the cascade connection is connected to the one AC/DC converting cell and receives the electric signal output by the one AC/DC converting cell, and
among the plurality of isolating components connected in cascade, the isolating component connected at another end is connected to the control apparatus and supplies the control apparatus with the electric signal received from the one AC/DC converting cell.

8. The multi-cell converter apparatus according to claim 7, wherein
each AC/DC converting cell includes a detecting section that detects a malfunction inside the AC/DC converting cell, and
each detecting section outputs a detection signal providing notification that a malfunction was detected, as the electric signal, to the isolating component connected at the one end.

9. The multi-cell converter apparatus according to claim 8, wherein
the control apparatus stops a control operation of all of the AC/DC converting cells in response to receiving the detection signal providing notification that a malfunction was detected from one or more AC/DC converting cells among the plurality of AC/DC converting cells.

* * * * *